(12) United States Patent
Kobayashi et al.

(10) Patent No.: US 9,094,594 B2
(45) Date of Patent: Jul. 28, 2015

(54) SOLID-STATE IMAGING DEVICE

(75) Inventors: Mitsuyoshi Kobayashi, Tokyo (JP); Hideyuki Funaki, Tokyo (JP); Risako Ueno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 13/039,508

(22) Filed: Mar. 3, 2011

(65) Prior Publication Data

US 2012/0057020 A1    Mar. 8, 2012

(30) Foreign Application Priority Data

Sep. 7, 2010    (JP) .................................. 2010-199838

(51) Int. Cl.
    H04N 7/18      (2006.01)
    H04N 5/225     (2006.01)
    G01C 3/08      (2006.01)
    G01C 3/10      (2006.01)

(52) U.S. Cl.
    CPC ................ H04N 5/2254 (2013.01); G01C 3/08 (2013.01); G01C 3/10 (2013.01)

(58) Field of Classification Search
    None
    See application file for complete search history.

(56) References Cited

U.S. PATENT DOCUMENTS

| | | | |
|---|---|---|---|
| 2004/0027681 A1* | 2/2004 | Sunagawa et al. | 359/643 |
| 2007/0014019 A1* | 1/2007 | Mouli | 359/619 |
| 2007/0040828 A1* | 2/2007 | Zalevsky et al. | 345/418 |
| 2008/0142681 A1* | 6/2008 | Takizawa et al. | 250/201.3 |
| 2008/0317454 A1* | 12/2008 | Onuki | 396/128 |
| 2009/0027542 A1* | 1/2009 | Yamamoto et al. | 348/340 |
| 2009/0128658 A1* | 5/2009 | Hayasaka et al. | 348/222.1 |
| 2009/0153693 A1* | 6/2009 | Onuki et al. | 348/222.1 |
| 2010/0066823 A1* | 3/2010 | Westphal et al. | 348/79 |
| 2010/0141802 A1* | 6/2010 | Knight et al. | 348/240.3 |
| 2010/0283884 A1* | 11/2010 | Hayasaka et al. | 348/340 |

(Continued)

FOREIGN PATENT DOCUMENTS

| | | |
|---|---|---|
| JP | 62-089010 | 4/1987 |
| JP | 2004-251984 | 9/2004 |

(Continued)

OTHER PUBLICATIONS

Japanese Office Action mailed Aug. 17, 2012 for Japanese Application No. 2010-199838.

(Continued)

*Primary Examiner* — Christopher S Kelley
*Assistant Examiner* — Kaitlin A Retallick
(74) *Attorney, Agent, or Firm* — Amin, Turocy & Watson, LLP (57) ABSTRACT

According to an embodiment, a solid-state imaging device includes: an imaging device including an imaging area including a plurality of pixel blocks each of which includes a plurality of pixels; an image formation lens forming an image on an image formation plane by using light from a subject; an aperture unit including a plurality of aperture elements provided to associate with the plurality of pixel blocks, each of the aperture elements having an aperture portion and a shield portion, light from the image formation lens being filtered by each aperture element; a microlens array including a plurality of microlenses provided to associate with the plurality of aperture elements, each of the microlenses forming an image in the imaging area by using light filtered by an associated aperture element; and a signal processing circuit configured to process a signal of an image taken in the imaging area and estimates a distance to the subject.

11 Claims, 12 Drawing Sheets

(56) References Cited

U.S. PATENT DOCUMENTS

| | | |
|---|---|---|
| 2012/0050589 A1 | 3/2012 | Ueno et al. |
| 2012/0062771 A1 | 3/2012 | Ueno et al. |

FOREIGN PATENT DOCUMENTS

| | | |
|---|---|---|
| JP | 2007-155930 | 6/2007 |
| JP | 2008-152065 | 7/2008 |
| JP | 2009-244662 | 10/2009 |

OTHER PUBLICATIONS

Adelson et al, Single Lens Stereo with a Plenoptic Camera, IEEE Transactions on Pattern Analysis and Machine Intelligence, vol. 14, No. 2, 1992.

* cited by examiner

SOLID-STATE IMAGING DEVICE

CROSS-REFERENCE TO RELATED APPLICATION

This application is based upon and claims the benefit of priority from prior Japanese Patent Application No. 2010-199838 filed on Sep. 7, 2010 in Japan, the entire contents of which are incorporated herein by reference.

FIELD

Embodiments described herein relate generally to a solid-state imaging device.

BACKGROUND

As an imaging technique capable of obtaining a distance in the depth direction from two-dimensional array information, a technique using a reference ray, a stereo distance measuring technique using a plurality of cameras, and so on are known. In recent years, needs for such techniques are increasing as new input devices in the use of public welfare.

As an imaging scheme capable of obtaining the distance without using a reference ray in order to hold down the cost, there is a scheme using that a ray angle from a subject via an image formation lens contains distance information as the principle of the distance measurement. For example, a structure in which an image formation microlens array (MLA) is disposed over pixels and an aperture for dividing the ray is disposed on the object side of each image formation microlens has been proposed. Each image formation microlens acquires an image having a peak in intensity distribution according to a distance to the subject by re-imaging an image imaged by an image formation lens from each position. The distance to the subject can be estimated by measuring the number of signal peaks.

DETAILED DESCRIPTION

A solid-state imaging device according to an embodiment includes: an imaging device including an imaging area including a plurality of pixel blocks each of which includes a plurality of pixels; an image formation lens forming an image on an image formation plane by using light from a subject; an aperture unit including a plurality of aperture elements provided to associate with the plurality of pixel blocks, each of the aperture elements having an aperture portion and a shield portion, light from the image formation lens being filtered by each aperture element; a microlens array including a plurality of microlenses provided to associate with the plurality of aperture elements, each of the microlenses forming an image in the imaging area by using light filtered by an associated aperture element; and a signal processing circuit configured to process a signal of an image taken in the imaging area and estimates a distance to the subject.

Figure 1:
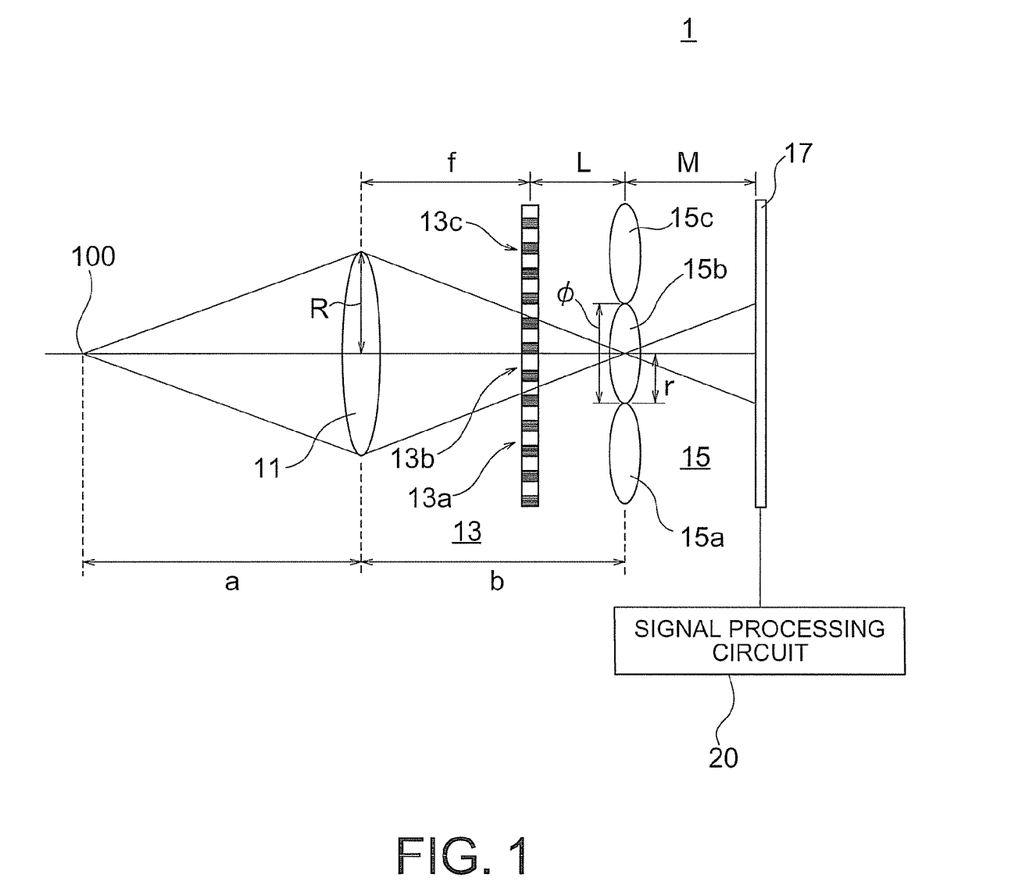
FIG. 1 is a diagram showing a solid-state imaging device according to an embodiment.

Hereafter, a solid-state imaging device according to embodiments will be described more specifically with reference to the drawings. A solid-state imaging device according to the present embodiment is shown in FIG. 1. A solid-state imaging device 1 according to the present embodiment includes an image formation lens 11, an aperture or an aperture unit 13, a microlens array 15, an imaging element or an imaging device 17, and a signal processing circuit 20. The aperture 13 is divided into a plurality of aperture elements 13a, 13b and 13c. The microlens array 15 includes a plurality of microlenses 15a, 15b and 15c. Each microlens 15i (i=a, b, c) is provided to be associated with an aperture element 13i. The imaging element 17 has an imaging area including a plurality of pixel blocks. Each pixel block includes a plurality of pixels.

Light emitted from a subject 100 is incident on a pixel in the imaging element 17 through the image formation lens 11, the 10 aperture 13, and the microlens array 15. Information concerning the subject 100 is converted to an electric signal by the imaging element 17. The electric signal which is output from the imaging element 17 is processed by the signal processing circuit 20 and an image of the subject 100 is obtained. In addition, the distance to 15 the subject 100 is estimated.

In FIG. 1, "a" represents a distance between the image formation lens 11 and the subject 100, "b" an image formation distance obtained from the image formation lens 11, "f" a focal length of the image formation lens 11, "R" an aperture diameter (radius of the image formation lens), "φ" a diameter of the microlens, "r" a radius of the microlens (=φ/2), "L" a distance between the aperture 13 and the microlens 15, and "M" a distance between the microlens 15 and the imaging element 17.

(Aperture)

The aperture 13 will now be described. The aperture 13 is installed to obtain information concerning the distance to the subject 100. The number of divisions of the aperture 13 (i.e., the number of aperture elements) corresponds to the resolution of the distance information.

Figure 2:
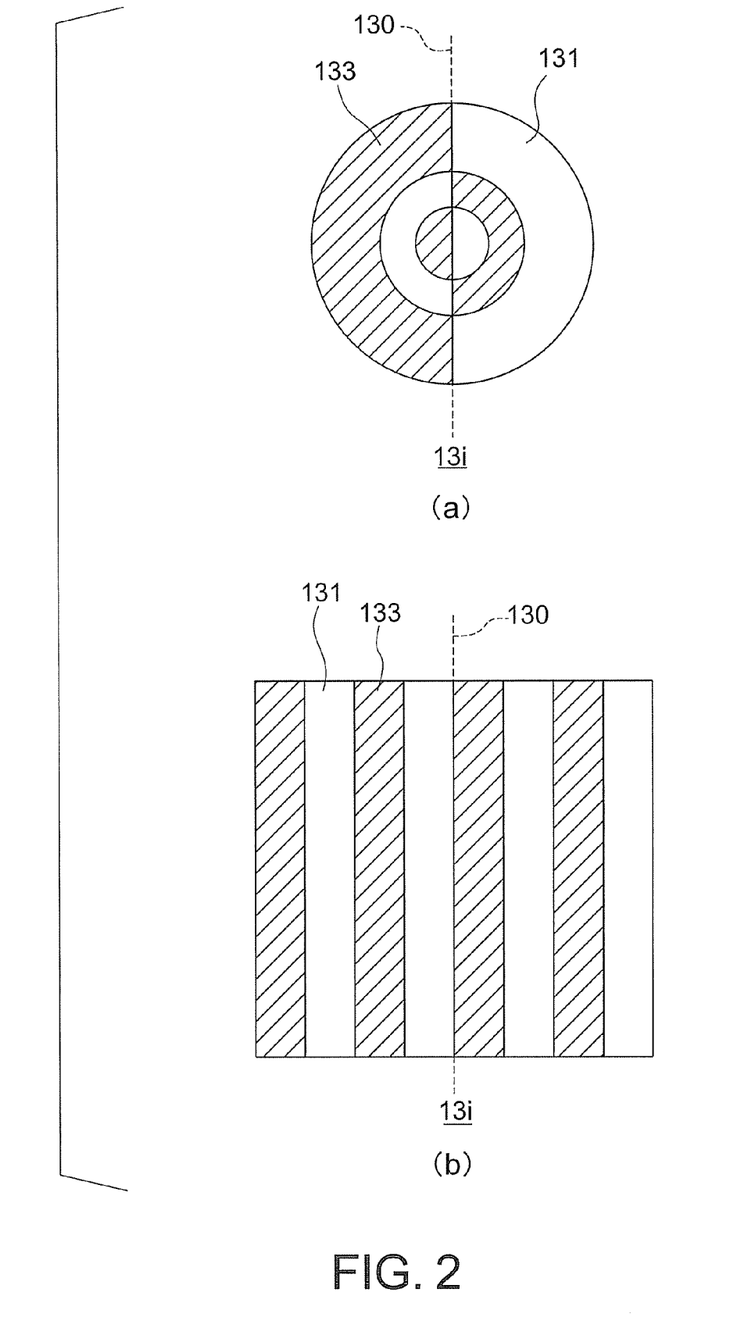
FIGS. 2(a) and 2(b) are diagrams showing a concrete example of aperture elements of a solid-state imaging device according to an embodiment.

Concrete examples of an aperture element (for example, an aperture element 13i) included in the aperture 13 are shown in FIGS. 2(a) and 2(b). As shown in FIGS. 2(a) and 2(b), the aperture element 13i takes a shape in which an aperture portion 131 and a shield portion 133 are disposed in positions which are symmetrical with respect to a center axis 130. In other words, the aperture portion 131 located on the left side of the center axis 130 is disposed in a position symmetrical to that of the shield portion 133 located on the right side of the center axis 130. The shield portion 133 located on the left side of the center axis 130 is disposed in a position symmetrical to that of the aperture portion 131 located on the right side of the center axis 130. In this way, the aperture portion 131 and the shield portion 133 are disposed in positions which are symmetrical with respect to the center axis 130. Viewing from the whole aperture element, however, the center axis 130 is not a symmetrical axis, but is an asymmetrical axis. In other words, the aperture element 13i becomes bilaterally asymmetrical. FIG. 2(a) shows an example in which the aperture portion 131 and the shield portion 133 are disposed to each occupy half of each concentric annular area. FIG. 2(b) shows a configuration in which the aperture portion 131 and the shield portion 133 are disposed alternately to extend along the center axis 130.

Each aperture element 13i (i=a, b, c) is associated with a corresponding microlens 15i. The aperture 13 has a configuration in which the aperture elements 13a, 13b and 13c are arranged in an array form. Each aperture element 13i (i=a, b, c) is disposed to have its center on the same axis as that of the center of the microlens 15i.

A method for obtaining information concerning the distance to the subject 100 based on stripe patterns of an image taken into 25 the imaging element 17 by providing the aperture 13 will be described later.

Figure 4:
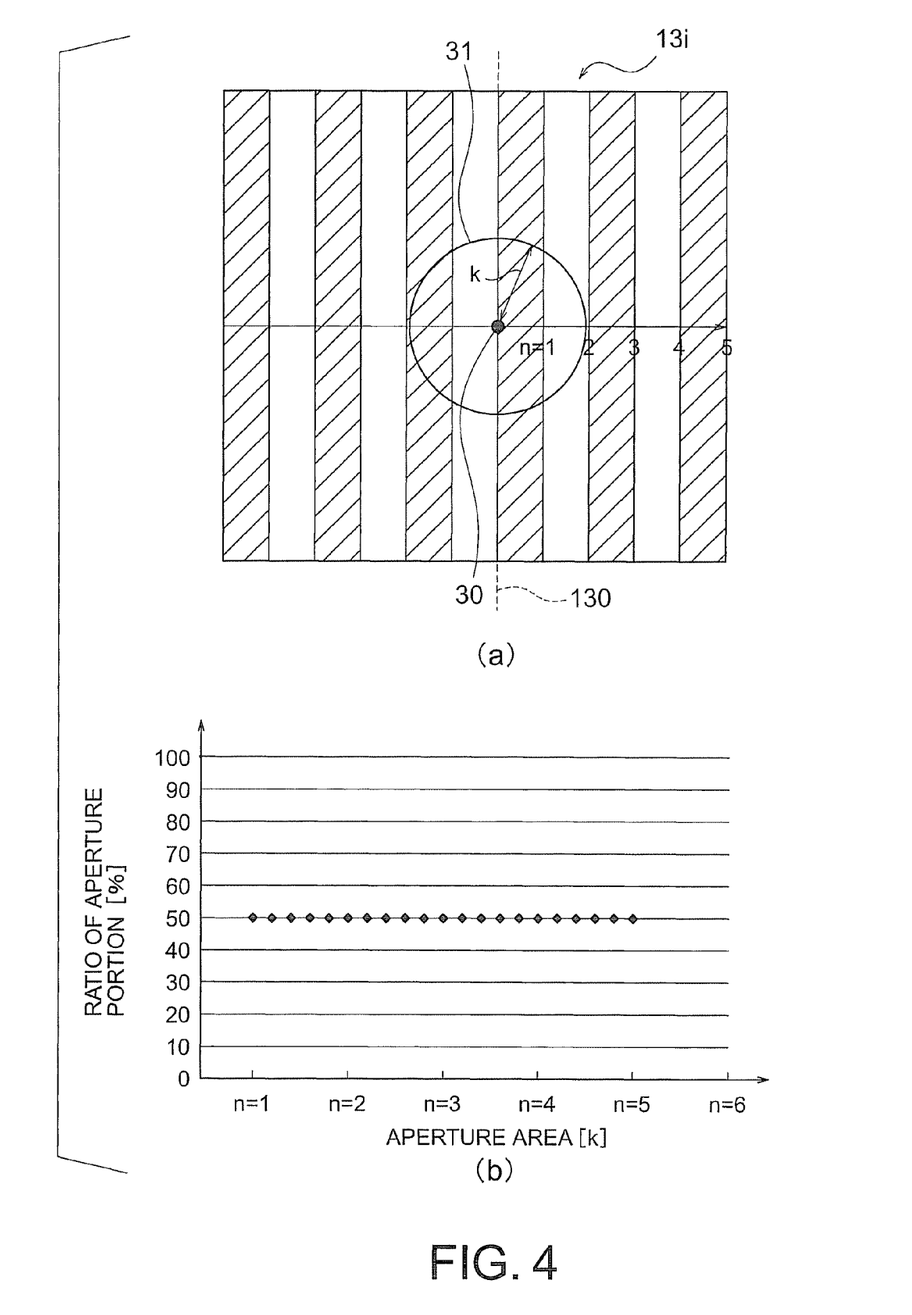
FIGS. 4(a) and 4(b) are diagrams for explaining a suppression effect of a light quantity change in a solid-state imaging device according to an embodiment.
Figure 5:
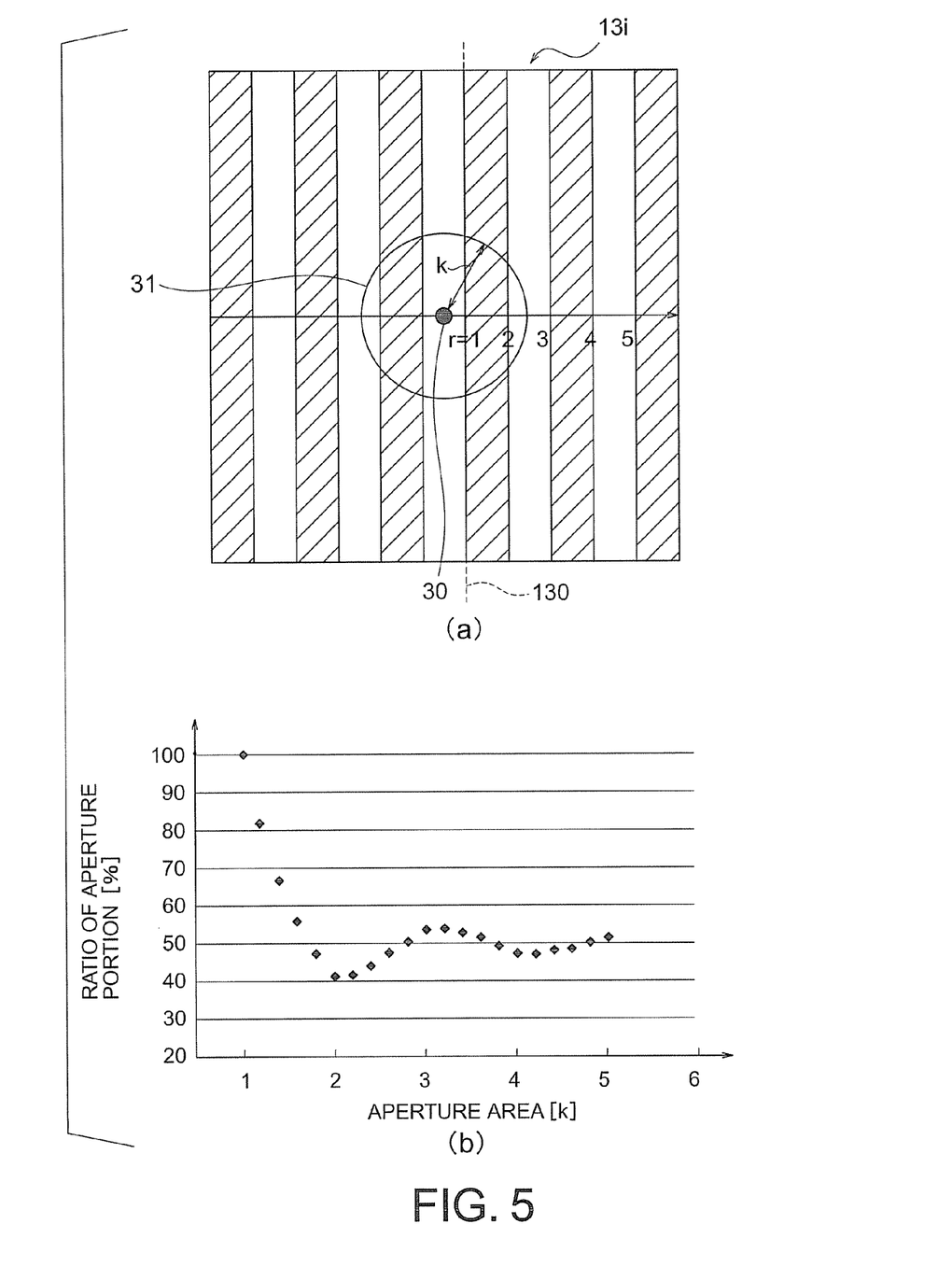
FIGS. 5(a) and 5(b) are diagrams for explaining a suppression effect of a light quantity change in a solid-state imaging device according to an embodiment.
Figure 6:
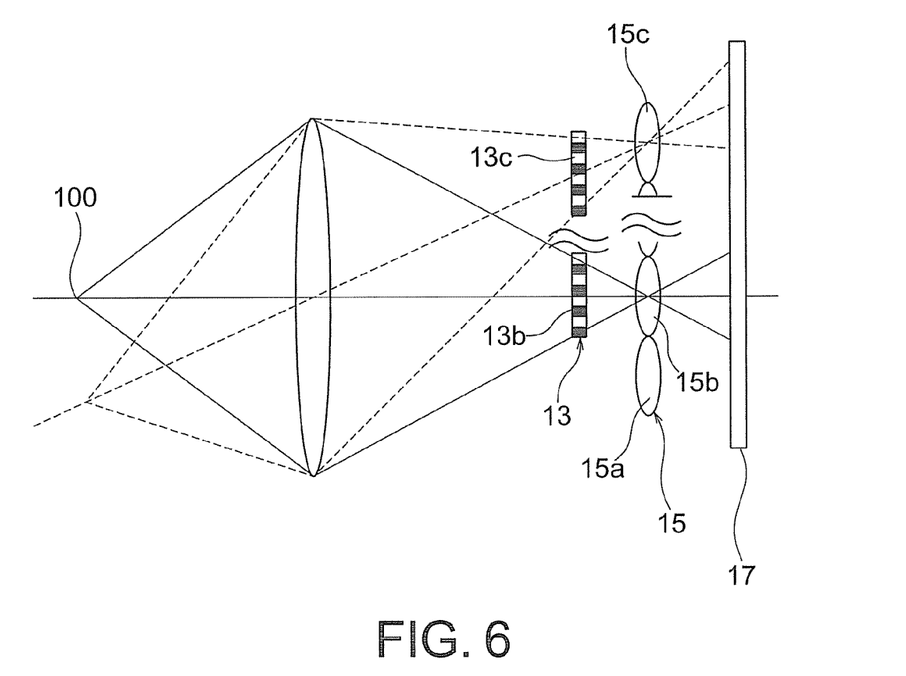
FIG. 6 is a diagram showing a position of an aperture of every principal ray in a solid-state imaging device according to an embodiment.

A change of light quantity incident on the imaging element 17 which depends upon the position relation between the aperture element 13i and the incidence position of the principal ray is incident on the aperture element 13i will now be described with reference to FIGS. 3 to 5.

Figure 3:
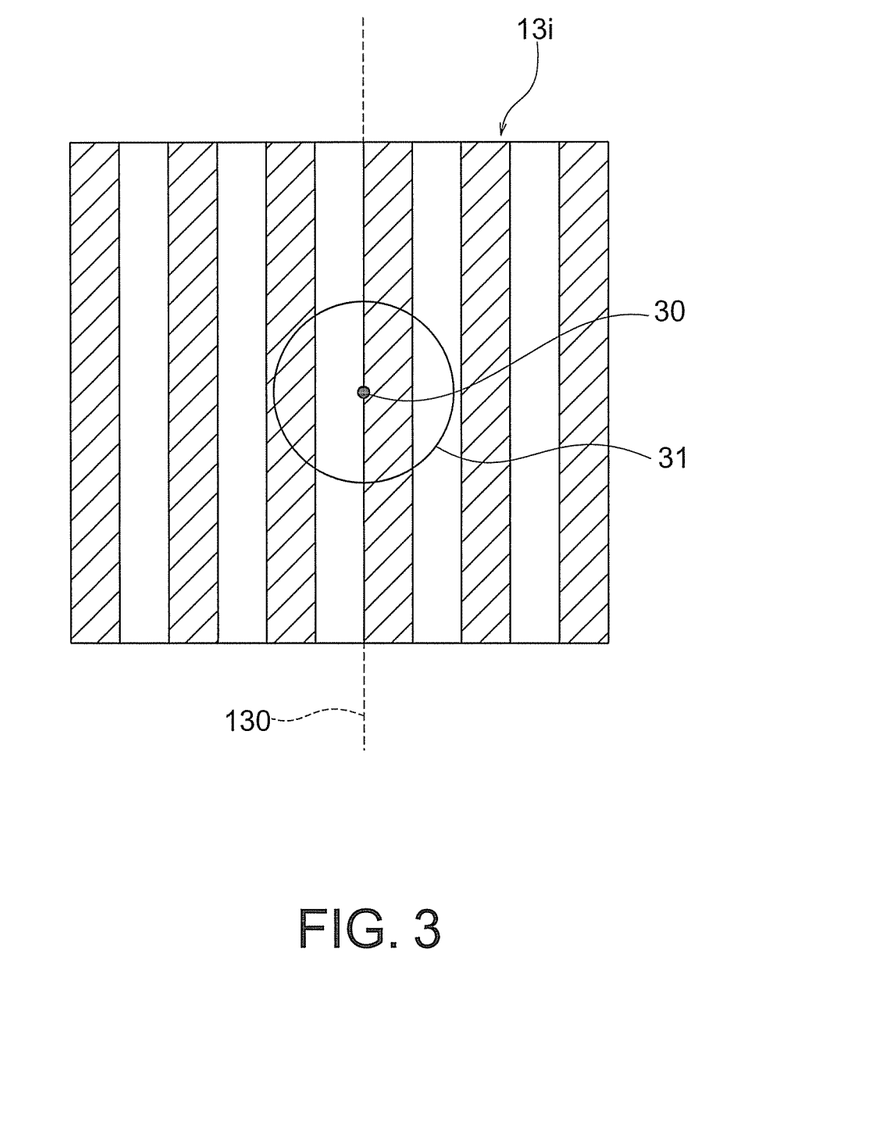
FIG. 3 is a diagram for explaining a suppression effect of a light quantity change in a solid-state imaging device according to an embodiment.

FIG. 3 is a plan view showing the aperture element 13i in the case where an incidence position 30 of the principal ray is located on the center axis 130 of the aperture element 13i, i.e., in the case where the center axis 130, being coplanar or approximately coplanar with an object-side surface of aperture element 13i coincides with and is perpendicular or approximately perpendicular with the center of the optical axis. In the aperture element 13i shown in FIG. 3, a range of an image of the subject 100 formed by the image formation lens 11 is denoted by a reference numeral 31. The light quantity incident on the imaging element 17 in the case where the center of the optical axis and the center axis 130 of the aperture element 13i are made to coincide with each other as shown in FIG. 4(a) is shown in FIG. 4(b). In FIGS. 4(a) and 4(b), k denotes a radius of the area 31 of the image of the subject 100 in the aperture element 13i around the incidence position 30 of the principal ray, and n (=1, 2, 3, 4, 5) indicates a position where a straight line which passes through the incidence position 30 and assumes a direction to be perpendicular to the center axis 130 intersects a boundary between the aperture portion 131 and the shield portion 133 in the aperture element 13i and a number is provided in the order from the vicinity of the incidence position 30. The abscissa axis in FIG. 4(b) indicates the radius of the area 31 of the image of the subject 100 in the aperture element 13i, and the ordinate axis represents the ratio of the aperture portion 131 in the aperture element 13i. The ratio of the aperture portion 131 means the ratio of the area of the aperture portion 131 in the area 31 to the area of the area 31. As apparent from FIG. 4(b), the light quantity incident on the imaging element 17 is always constant and one-half the light quantity incident on the aperture element 13i.

On the other hand, if the center axis 130 of the aperture is deviated from the center 30 of the optical axis as shown in FIG. 5(a) or the aperture element takes an axis-symmetrical shape, then a light quantity difference is generated in the image obtained by the imaging element 14 according to the distance to the subject as shown in FIG. 5(b). Therefore, the change of the light quantity can be suppressed by providing the aperture element 13i with the shape used in the present embodiment, i.e., by providing the aperture element 13i with a shape to dispose the aperture portion 131 and the shield portion 133 in positions which are symmetrical with respect to the center axis of the aperture element 13i and make the center 30 of the optical axis coincide with the center axis 130 of the aperture. At this time, the aperture element becomes asymmetrical with respect to the center axis 30 of the optical axis.

In the case of an off-optical axis ray which is incident on the image formation lens at an angle with respect to the optical axis, it is necessary for the aperture to cope with the obliquely incident light in order to form a stripe pattern according to the distance. Specifically, a method for curving the aperture or shifting the aperture from the center of the microlens is necessary. However, the method for measuring the distance based on the number of stripe patterns is the same.

(Microlens Array)

The microlens array 15 needs to be disposed to separate images of aperture elements 13i in the imaging element 17 without overlapping. The microlens array 15 plays an important role in obtaining the distance information in the present embodiment. The diameter of the microlens 15i (i=a, b, c) is equal to the diameter of the corresponding aperture element 13i. The microlens array 15 obtained by arranging a plurality of microlenses 15i in a two-dimensional form is disposed on the side of the imaging element 17 as compared with the aperture 13.

(Position Relations of Aperture, Microlens Array, and Imaging Element)

The aperture 13 is disposed to be located at the focal length "f" of the image formation lens 11. When the subject 100 is located at infinity in this case, the light of the subject 100 forms an image at a minimum point image radius on the plane of the aperture 13. When the subject 100 is located at infinity, the light passed through the aperture 13 forms an image having no stripe pattern. As the subject 100 comes closer to the image formation lens 11, the number of stripe patterns increases.

Figure 7:
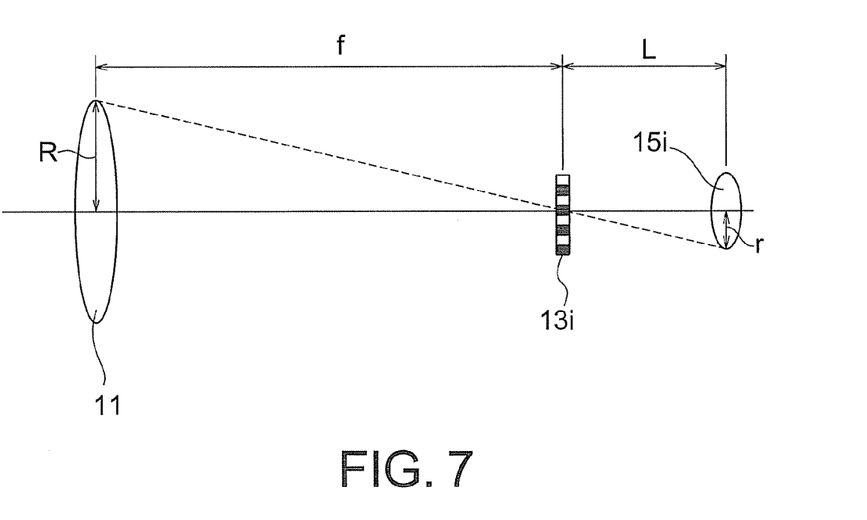
FIG. 7 is a diagram showing position relations between an aperture and a microlens in a solid-state imaging device according to an embodiment.

The distance "L" between the aperture 13 and the microlens array 15 depends upon the focal length "f" of the image formation lens 11 and the radius "r" of the microlens 15i. As shown in FIG. 7, the maximum value of "L" becomes a distance between the image formation point and the aperture 13$i$ which becomes a limit where the light converged by the image formation lens 11 is put in the microlens 15$i$. Therefore, a range which can be assumed by "L" is represented by an inequality.

$$L \le \frac{r}{R} f$$

Figure 8:
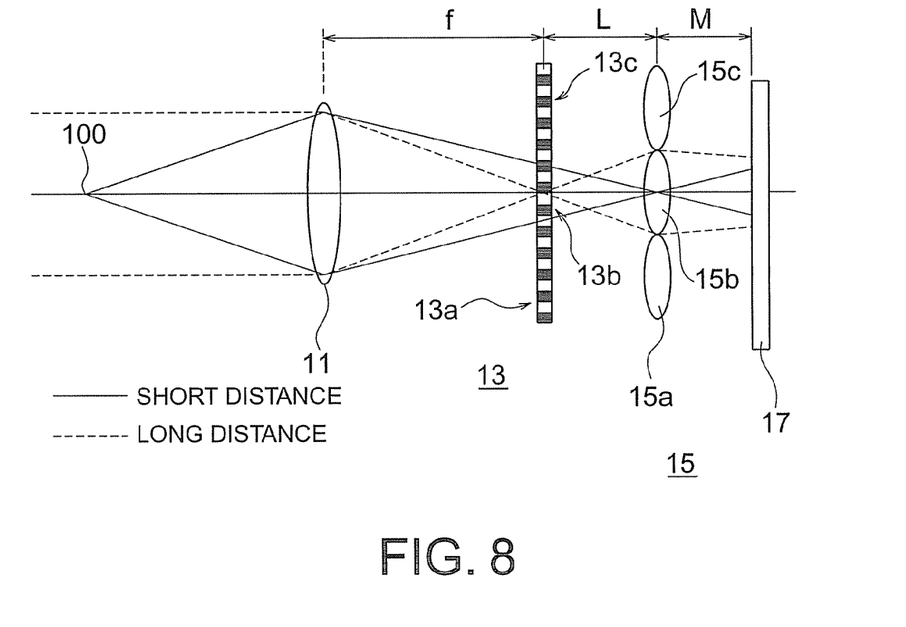
FIG. 8 is a diagram showing position relations among an image formation lens, an aperture, a microlens, and an imaging element in a solid-state imaging device according to an embodiment.

For example, assuming that R=4 mm, f=16 mm, and φ=30 μm, the range which can be assumed by "L" is a range of 60 μm from the focal point of the image formation lens 11 in the direction of the imaging element 17. If the microlens array 15 is installed in the position of L=60 μm, therefore, light rays which are emitted from the subject 100 and which are incident on the imaging element 17 become as shown in FIG. 8. In FIG. 8, light at apogee (represented by dashed lines) is converged after being passed through the microlens 15$b$, whereas light at perigee (represented by solid lines) arrive at the imaging element 17 while holding information of the stripe pattern. Therefore, the installation position of the microlens array 15 is made nearly equal to an image formation distance "b" which is obtained when the subject 100 is located at the shortest distance in the distance range of the subject where distance information can be acquired.

A position relation required of the imaging element 17, i.e., a distance M between the microlens 15$i$ and the imaging element 17 will be now described based on the foregoing description.

Figure 9:
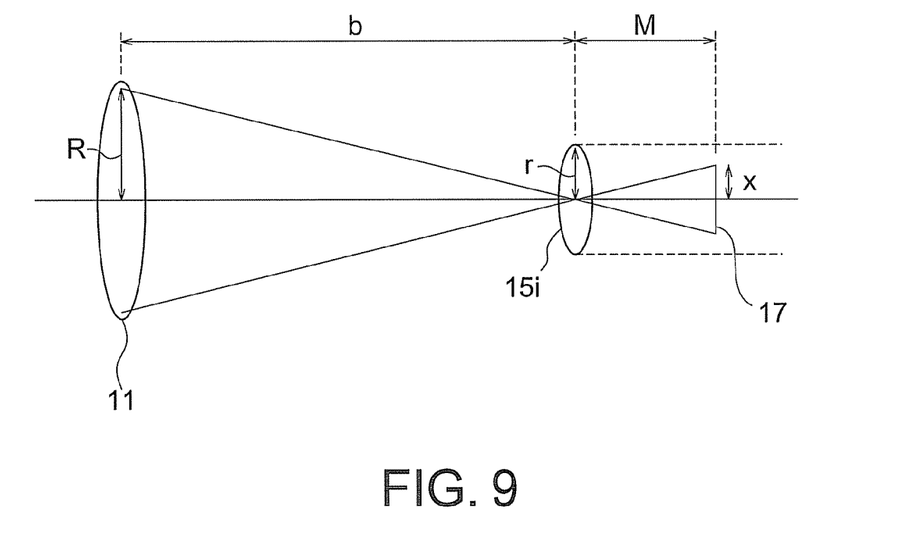
FIG. 9 is a diagram for explaining a range in which light converged by an image formation lens is spread in a solid-state imaging device according to an embodiment.

Denoting a radius of spread of a real image in the imaging element 17 after being passed through the microlens 15$i$ by x, the value of x is represented as $$x = \frac{M}{b} R$$

as appreciated from FIG. 9. The range of M where "x" is prevented from overlapping on the image forming plane, i.e., in the imaging element 17 becomes the following condition.

$$M \le \frac{r}{R} b \quad (1)$$

Figure 10:
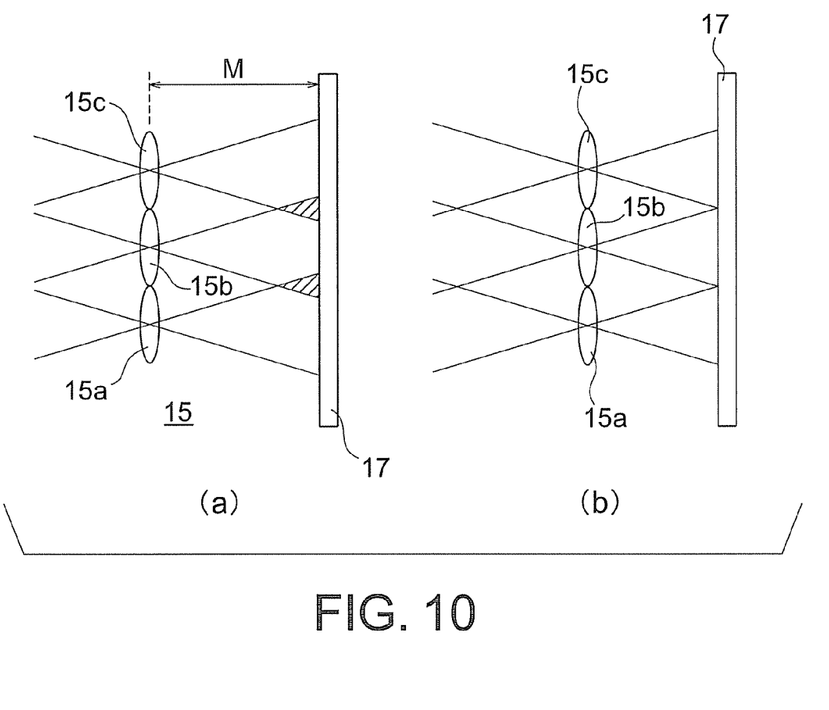
FIGS. 10(a) and 10(b) are diagrams for explaining overlapping areas depending on position relations between microlenses and imaging elements in a solid-state imaging device according to an embodiment.

If this condition is satisfied, an area where images of the microlens 15$i$ overlap on the imaging element 17 is eliminated. For utilizing effective pixels fully, a value of M which is great as far as possible should be used. The range where images of the microlens overlap in the imaging element 17 will now be described by using the expression with reference to FIGS. 10($a$) and 10($b$).

In FIG. 10($a$), a state which satisfies the following relation is indicated.

$$M \le \frac{r}{R} b$$

In FIG. 10($b$), a state which satisfies the following relation is indicated.

$$M = \frac{r}{R} b$$

Shaded ranges in FIG. 10($b$) represent overlapping ranges. Since the size of the area where images overlap on the imaging element changes according to the value of M in this way, it becomes necessary to set M in a range satisfying the expression (1) in order to avoid the duplication.

(Method for Obtaining Distance Information)

A method for obtaining distance information from the subject 100 based on the stripe pattern in an image taken in the imaging element 17 will now be described.

Figure 11:
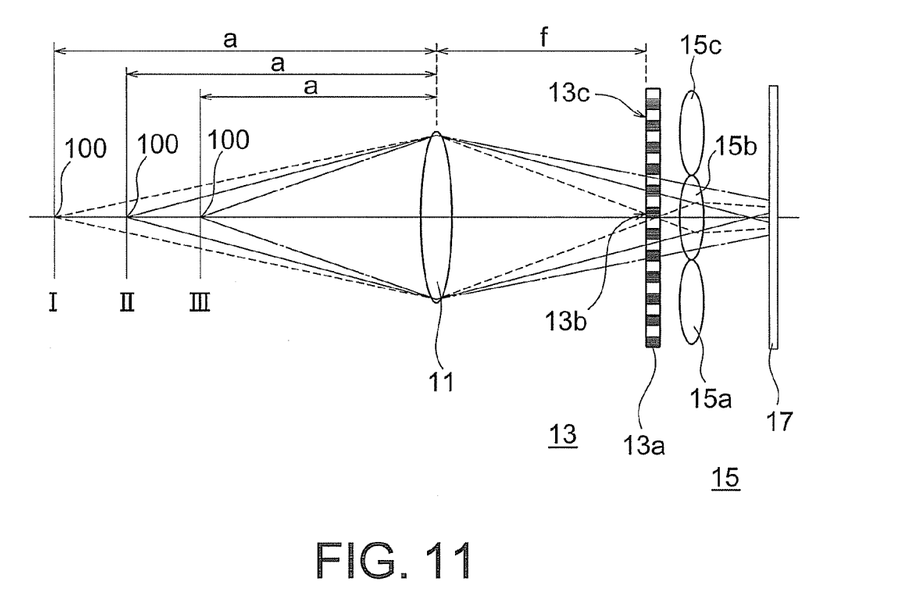
FIG. 11 is a diagram showing rays incident upon an imaging device which depends upon a position of a subject in a solid-state imaging device according to an embodiment.

If a distance "a" between the subject 100 and the camera differs as shown in FIG. 11, i.e., if the subject 100 is located in positions denoted by I, II and III, the position where an image formed by the image formation lens 11 changes according to the case.

Figure 12:
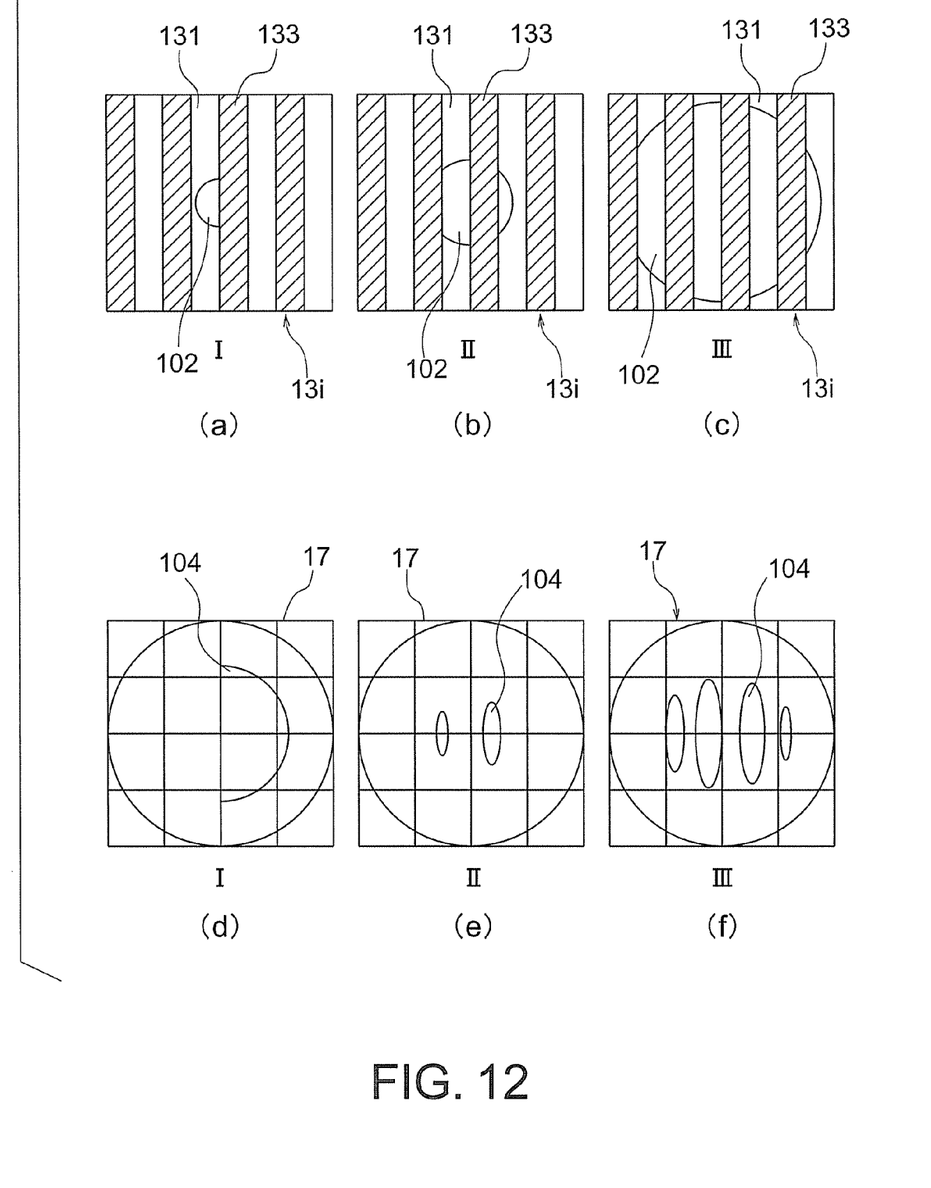
FIGS. 12(a) to 12(f) are diagrams for explaining images of a subject in aperture elements and imaging elements which depend upon the position of the subject in a solid-state imaging device according to an embodiment.

Images 102 in the aperture element 13$i$ of the subject 100 at the time when the subject 100 is located in the positions denoted by I, II and III are shown in FIGS. 12($a$), 12($b$) and 12($c$), and images 104 of the subject 100 in the imaging element 17 are shown in FIGS. 12($d$), 12($e$) and 12($f$). As appreciated from FIGS. 12($a$) to 12($f$), the image 104 obtained by using the imaging element 17 corresponds to light passed through passable aperture portions 131 in the aperture element 13$i$. Therefore, the image 104 has as many peaks as the number of the aperture portions through which the light has actually passed. The distance to the subject 100 can be obtained based on the number of peaks in the real image 104.

Figure 13:
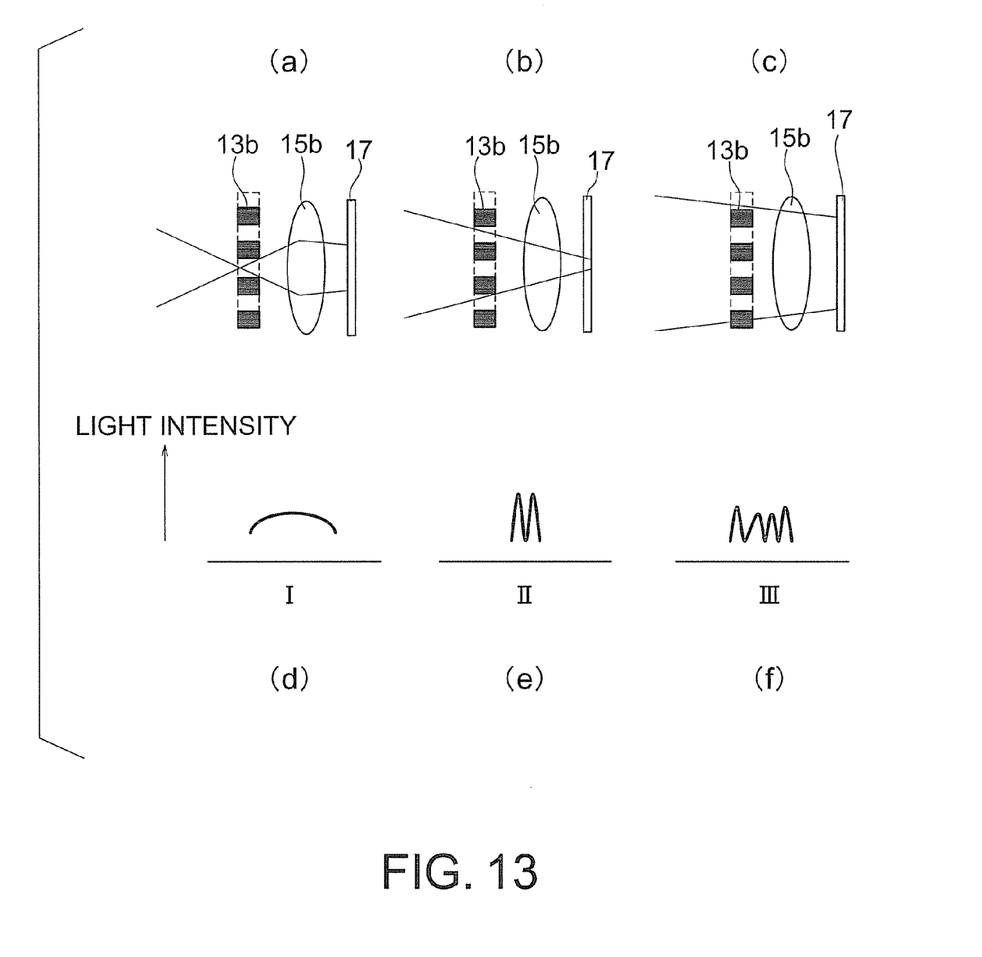
FIGS. 13(a) to 13(f) are diagrams showing a signal intensity received by imaging elements as light which depends upon a position of a subject in a solid-state imaging device according to an embodiment.

Light rays passed through the aperture element 13$i$ and the microlens 15$i$ at the time when the subject 100 is located in the positions denoted by I, II and III are shown in FIGS. 13($a$), 13($b$) and 13($c$), and signal intensities in the imaging element 17 obtained in the respective positions are shown in FIGS. 13($d$), 13($e$) and 13($f$).

The distance to the subject 100 is obtained as described hereafter.

First, in the image formation lens 11, the following expression holds true.

$$\frac{1}{a} + \frac{1}{b} = \frac{1}{f}$$

Because of the expression and similarity of triangles in the light ray trajectory, a real image radius r' on the aperture 13 is represented by the following expression.

$$r' = (b - f)\frac{R}{b} \quad (2)$$

If a laterally asymmetric aperture 13 is installed between the image formation lens 11 and the microlens 15, therefore, the size of the image formed on the aperture 13 changes depending on the distance. As described with reference to FIGS. 12($a$) to 12($f$), the image 104 obtained by the imaging element 17 corresponds to light which has passed through the passable aperture portion 131 in the aperture element 13$i$ at this time. Therefore, the image 104 has as many stripe pattern peaks as the number of aperture portions 131 through which the light has actually passed. The distance to the subject 100 can be obtained based on the number of peaks in this real image. For example, the case where R=4 mm, f=16 mm, φ=30 μm, and the width of each of the shield portion 133 and the aperture portion 131 in the aperture 13 is 3 μm will now be described.

Figure 14:
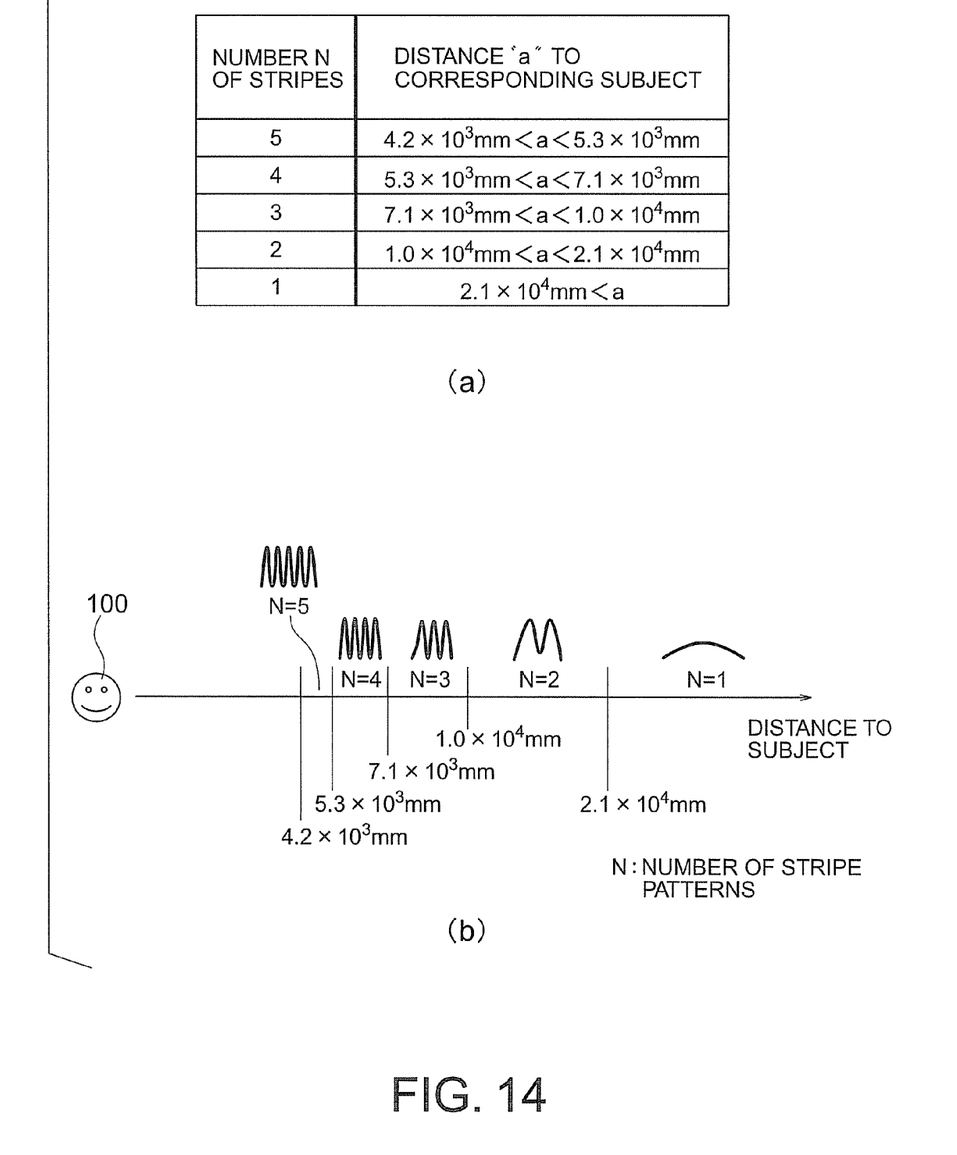
FIGS. 14(a) and 14(b) are diagrams showing relations between the number of stripes in imaging elements and a distance to a subject, which depends upon a position of the subject in a solid-state imaging device according to an embodiment.

Both the aperture portion 131 and the shield portion 133 in the aperture 13 have the size of 3 μm. Therefore, the condition of the real image radius r' on the aperture 13 having N stripe pattern peaks formed thereon can be represented as a range of 3(N−1)<r'<3N because of the size of the aperture portion 131 on which light is incident. Results obtained by substituting r' in Expression (2) into this condition and conducting a calculation are shown in FIGS. 14(a) and 14(b). FIG. 14(a) is a table showing relations between the number N of stripes and the distance "a" to the subject 100. FIG. 14(b) is a diagram showing the relations schematically. As appreciated from FIGS. 14(a) and 14(b), the distance can be resolved. Denoting the width of the shield portion 133 in the aperture element 13i by W, information of the distance "a" to the subject 100 has [r'/W] resolutions in principle. Here, [x] represents a maximum integer which does not exceed x. For example, in the case where N=2, i.e., the number of stripe pattern peaks is two, r' can assume the range 3 μm<r'<6 μm. Substituting Expression (2) into it, the following Expression (3) is obtained.

$$3 \ \mu m < \frac{f}{a} R < 6 \ \mu m \quad (3)$$

Rearranging it, the following Expression (4) is obtained.

$$\frac{fR}{6 \ \mu m} < a < \frac{fR}{3 \ \mu m} \quad (4)$$

Substituting values of f and R into Expression (4), the relation $$1.0 \times 10^4 \text{ mm} < a < 2.1 \times 10^4 \text{ mm}$$

is obtained. If the distance "a" to the subject is in this range, two stripe pattern peaks exist as shown in FIG. 14(a) and it can be distinguished from other distances to the subject.
(Method for Obtaining Two-Dimensional Image Concurrently with Distance Information)

Figure 15:
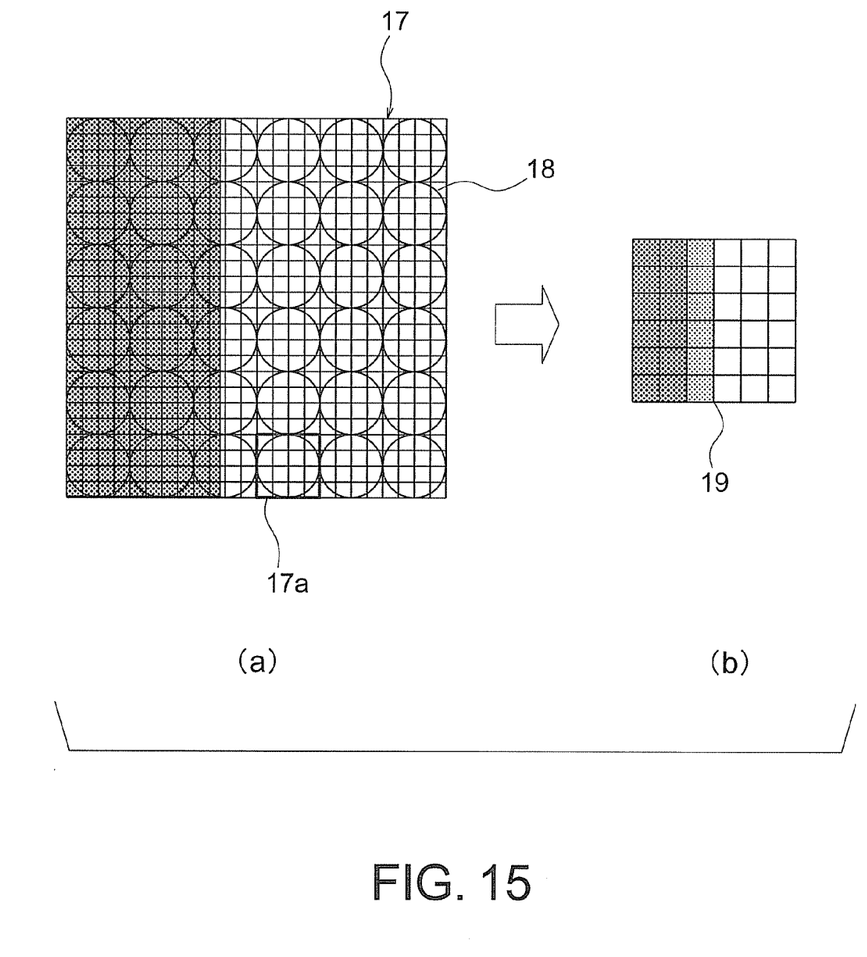
FIGS. 15(a) and 15(b) are diagrams for explaining an acquisition method of a two-dimensional image in a solid-state imaging device according to an embodiment.

A method for obtaining a two dimensional image concurrently with distance information will now be described with reference to FIGS. 15(a) and 15(b). The top of the imaging element 17 is partitioned into image sensor areas each correspond to one microlens, and each image sensor area is referred to as pixel block 17a. FIG. 15(a) is its schematic diagram. Supposing that the pixel block 17a has a size of k×k in pixel units, the pixel block 17a has k×k areas. Reference numeral 18 in FIG. 15(a) represents a position obtained by projecting the microlens 15i onto the imaging element 17. Distribution of pixel signals obtained in the pixel block 17a is associated with distance information by the aperture 13 and the microlens 15. Therefore, the signal distribution in the pixel block 17a does not reflect the two-dimensional image information. Therefore, the two-dimensional information is reproduced by averaging luminance values located right under one microlens and converting luminance values of a plurality of pixels in the pixel block 17a to one pixel. These arithmetic operations are conducted by the signal processing circuit 20 shown in FIG. 1.

Supposing that the imaging element 17 includes M×N pixels in this case, the pixel block 17a includes M×N/(k×k) pixels. In the example shown in FIG. 15(a), the number of pixels in the imaging element 17 is 24×24 and the number of pixels in the pixel block 17a is 4×4. In fact, however, the numerical values are not restricted to them.

A method for reproducing an original two-dimensional image from the image obtained by the imaging element 17 will now be described. The image of the microlens obtained by each pixel block 17a is formed to be blurred although it depends upon the distance to the subject. Therefore, an image is reconfigured by averaging signals obtained by pixels in each pixel block 17a and converting one pixel block to one pixel. This conversion is also conducted by the signal processing circuit shown in FIG. 1. An image 19 shown in FIG. 15(b) obtained by the reconfiguration described heretofore is a distribution diagram of light rays incident on the microlens array, and the influence of aberration caused by the microlens can be reduced.

According to the present embodiment, the resolution of the distance to the subject can be improved by incorporating the aperture as heretofore described.

It is possible to relax the light quantity change depending on the distance to the subject while measuring the distance by making the shape of the aperture asymmetric with respect to the optical axis center as described above.

Furthermore, since distance imaging in an ocellus (for example, a single lens or a single imaging element) is made possible, it is possible to simplify the system, reduce the cost, and suppress yield lowering caused by a component alignment error at the time of assembly as compared with compound eyes (for example, a plurality of lenses or a plurality of imaging elements).

Since the aperture does not have a mechanism part, errors such as metal fatigue caused by time elapse can be decreased at least.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   an imaging device comprising an imaging area including a plurality of pixel blocks each of which includes a plurality of pixels;
   an image formation lens forming an image on an image formation plane by using light from a subject;
   an aperture unit including a plurality of aperture elements provided to associate with the plurality of pixel blocks, each of the aperture elements having aperture portions and shield portions, light from the image formation lens being filtered by each aperture element, at least one aperture element having an associated aperture portion that is disposed symmetrically about a center axis of the aperture unit with respect to an associated shield portion of the at least one aperture element, wherein the center axis is perpendicular or approximately perpendicular to an optical axis of the image formation lens;
   a microlens array including a plurality of microlenses provided to associate with the plurality of aperture elements in one-to-one correspondence, the plurality of microlenses being located so that a light passing through an aperture element passes through an associated microlens, each of the microlenses forming an image in the imaging area by using light filtered by an associated aperture element; and
   a signal processing circuit configured to process a signal of an image taken in the imaging area and estimates a distance to the subject.

2. The device according to claim 1, wherein
   the aperture unit is disposed at a focal length of the image formation lens, the microlens array is disposed between the aperture unit and the imaging device, and the imaging device is disposed in a range which satisfies the following expression $$M \leq \frac{r}{R}b$$

where M is a distance between the microlens array and the imaging device, R is a radius of the image formation lens, r is a radius of the microlens, and b is a back side image plane distance.

3. The device according to claim 1, wherein the at least one aperture element has a configuration in which the aperture portion and the shield portion are disposed to each occupy half of each concentric annular area.

4. The device according to claim 1, wherein the at least one aperture element has a configuration in which the aperture portion and the shield portion are disposed along the center axis.

5. The device according to claim 1, wherein the signal processing circuit estimates the distance to the subject based on a number of stripe patterns in an image taken in the imaging area.

6. The device according to claim 1, wherein as each of the aperture elements departs from an optical axis of the image formation lens, a center position of each of the aperture elements deviates from a center position of an associated microlens.

7. A soli-state imaging device, comprising:

an imaging device comprising an imaging area including a plurality of pixel blocks each of which includes a plurality of pixels;

an image formation lens forming an image on an image formation plane by using light from a subject;

an aperture unit including a plurality of aperture elements provided to associate with the plurality of pixel blocks, each of the aperture elements having aperture portions and shield portions, an associated aperture portion of one of the aperture elements being disposed symmetrically about a center axis, which is coplanar with a surface of the aperture unit, with respect to an associated shield portion of the one of the aperture elements, light from the image formation lens being filtered by each aperture element of the plurality of aperture elements;

a microlens including a plurality of microlenses provided to associated with the plurality of aperture elements in one-to-one correspondence, the plurality of microlenses being located so that a light passing through an aperture element passes through an associated microlens, each of the microlenses forming an image in the imaging area by using light filtered by an associated aperture element of the plurality of aperture elements; and a signal processing circuit configured to process a signal of an image taken in the imaging area and to estimate a distance to the subject, wherein as each of the aperture elements departs from an optical axis of the image formation lens, a center portion of each of the aperture elements departs form a center position of an associated microlens.

8. The solid-state imaging device according to claim 7, wherein:

the aperture unit is disposed at a focal length of the image formation lens, the microlens array is disposed between the aperture unit and the imaging device, and the imaging device is disposed in a range which satisfies the following expression $$M \leq \frac{r}{R}b$$

wherein M is a distance between the microlens array and the imaging device, R is a radius of the image formation lens, r is a radius of the microlens, and b is a back side image plane distance.

9. The solid-state imaging device according to claim 7, wherein at least one aperture element of the plurality of aperture elements comprises a plurality of concentric annular areas, and has a configuration in which respective aperture portions and shield portions are disposed to each occupy half of respective concentric annular areas of the plurality of concentric annular aread.

10. The solid-state imaging device according to claim 7, wherein at least one aperture element of the plurality of aperture elements has a configuration in which the aperture portions and the shield portions are disposed along a center axis.

11. The solid-state imaging device according to claim 7, wherein the signal processing circuit estimates the distance to the subject based on a number of stripe patterns in an image taken in the imaging area.

\* \* \* \* \*